United States Patent [19]

Kato et al.

[11] Patent Number: 5,054,887
[45] Date of Patent: Oct. 8, 1991

[54] ACTIVE MATRIX TYPE LIQUID CRYSTAL DISPLAY

[75] Inventors: Hiroaki Kato, Nara; Toshihiko Hirobe, Sakai; Yoshitaka Hibino, Nara, all of Japan

[73] Assignee: Sharp Kabushiki Kaisha, Osaka, Japan

[21] Appl. No.: 391,244

[22] Filed: Aug. 9, 1989

[30] Foreign Application Priority Data

Aug. 10, 1988 [JP]  Japan .................... 63-200782

[51] Int. Cl.$^5$ .............................. G02F 1/13
[52] U.S. Cl. ..................... 359/59; 357/23.7; 357/54; 359/79; 359/87
[58] Field of Search .......... 350/334, 336, 339 R; 357/23.7, 54

[56]  References Cited

U.S. PATENT DOCUMENTS

| | | | |
|---|---|---|---|
| 3,671,820 | 6/1972 | Haering et al. ................ | 357/23.7 |
| 4,571,816 | 2/1986 | Dingwall .................... | 357/23.7 X |
| 4,778,560 | 10/1988 | Takeda et al. ............... | 357/23.7 X |
| 4,843,438 | 6/1989 | Koden et al. ................ | 357/23.7 |
| 4,905,066 | 2/1990 | Dohjo et al. ................. | 357/23.7 X |

FOREIGN PATENT DOCUMENTS

| | | |
|---|---|---|
| 0136509 | 8/1984 | European Pat. Off. . |
| 0288011 | 4/1988 | European Pat. Off. . |
| 6343553 | 8/1989 | Japan . |

OTHER PUBLICATIONS

1982 International Display Research Conference, Cherry Hill, N.J.; A. I. Lakatos, "Promise and Challenge of Thin-Film Silicon Approaches to Active Matrices"; p. 148, Col. 2, lines 26-38.

Primary Examiner—Andrew J. James
Assistant Examiner—Sara W. Crane

[57] ABSTRACT

An active matrix type liquid crystal display device includes a substrate on which a matrix picture element electrodes reside, TFTs which are disposed in the vicinity of each picture element electrodes, and capacitor electrodes are provided, each of which is opposed to one portion of each of the picture element electrodes. A dielectric lamination structure consisting of three insulating layers is formed between the picture element electrode and the capacitor electrode. The dielectric lamination structure includes an anodic oxidation film, a gate insulating layer and a protective insulating layer. The protective insulating layer further extending over the associated TFT.

13 Claims, 2 Drawing Sheets

FIG. 2
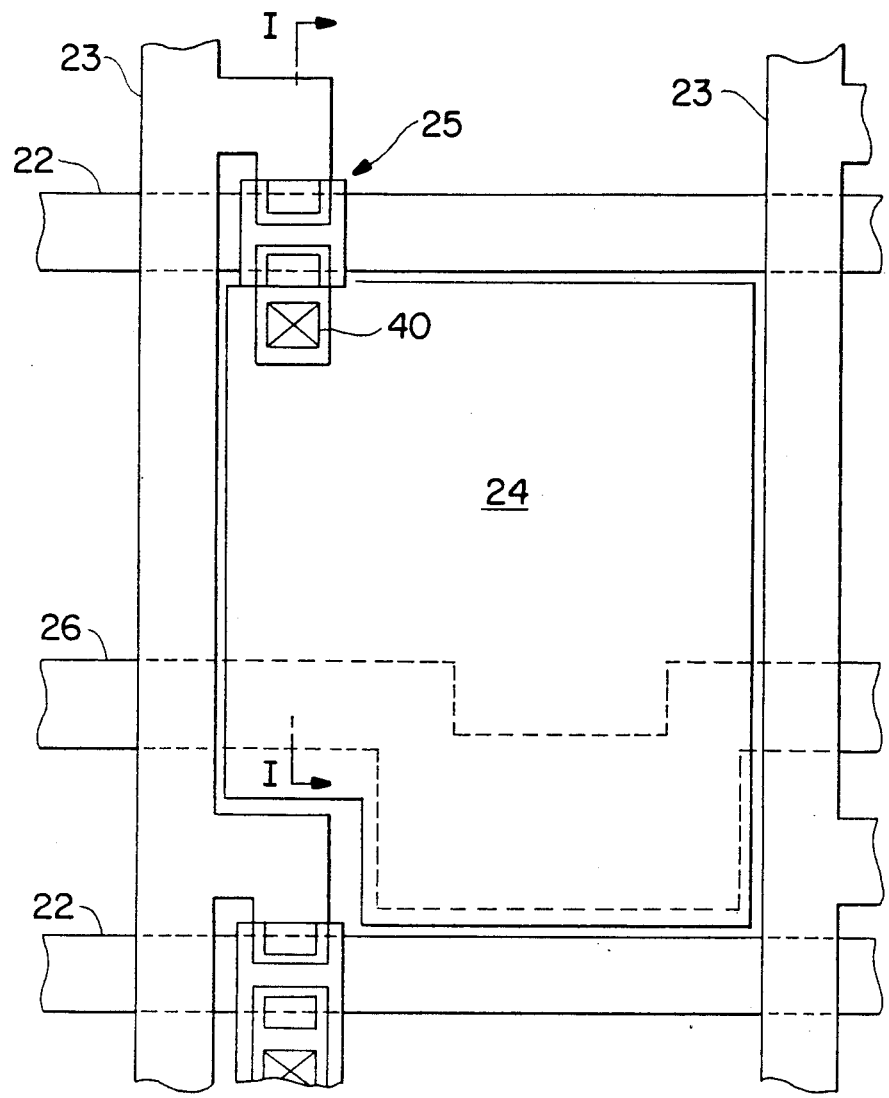
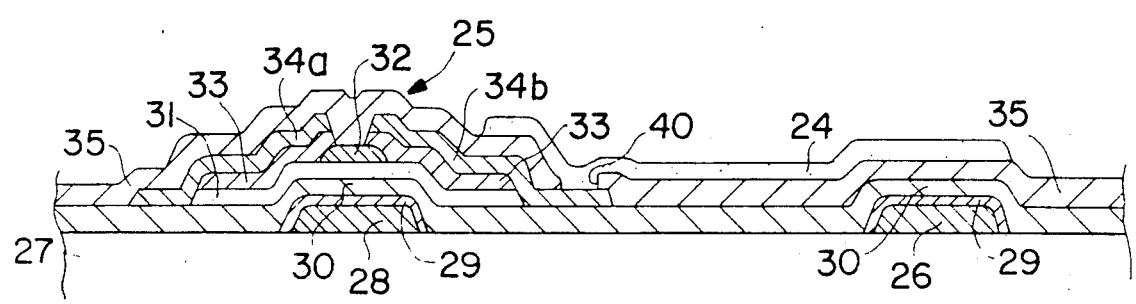
FIG. 1

5,054,887

ACTIVE MATRIX TYPE LIQUID CRYSTAL DISPLAY

BACKGROUND OF THE INVENTION

1. Field of the Invention

This invention relates to an active matrix type liquid crystal display device in which thin film transistors are used as non-linear switching elements, and more particularly to an active matrix type liquid crystal display device in which additional capacitors are formed.

2. Description of the Prior Art

In an active matrix type liquid crystal display device, thin film transistors (TFTs) are used as switching elements for driving picture elements. It is often necessary to use an additional capacitor for each picture element in order to improve the display quality.

FIG. 3 shows a substrate of a prior art active matrix type liquid crystal display device. TFTs and additional capacitors are formed on the substrate. A plurality of parallel gate bus lines 2 are formed in horizontally, and a plurality of source bus lines 3 are formed vertically on an insulating substrate 7 (FIG. 4). In the vicinity of each intersection of the gate bus lines 2 and source bus lines 3, a TFT 5 is formed. Each TFT 5 drives a picture element electrode 4 which is disposed in each region surrounded by two adjacent gate bus lines 2 and source bus lines 3. Under the picture element electrode 4, a capacitor electrode 6 is formed. Between the substrate assembly of FIG. 4 and an opposing substrate assembly (not shown), a liquid crystal material is sealed to construct a display device. Each picture element electrode 4 constitutes a picture element.

The structure of the substrate assembly will be described in more detail with reference to FIG. 4 which is a sectional view taken along line IV—IV of FIG. 3. The gate electrode 8 of the TFT 5 and the capacitor electrode 6 are formed on the surface of the insulating substrate 7. The gate electrode 8 is one part of the gate bus line 2. The gate electrode 8 and capacitor electrode 6 can be formed simultaneously, and are made of the same material. An anodic oxidation film 9 is formed on each of the gate electrode 8 and capacitor electrode 6. A gate insulating layer 10 is formed on the anodic oxidation films 9 and the remaining surface of the insulating substrate 7.

The TFT 5 further comprises an i-amorphous silicon (a-Si) film 11, an insulating film 12, n⁻-a-Si films 13, a source electrode 14a, and a drain electrode 14b which are laminated on the gate insulating layer 10. The source electrode 14a and drain electrode 14b are made of the same material as that of the source bus lines 3, and formed simultaneously with the source bus lines 3. The picture element electrode 4 is formed on the gate insulating layer 10, and electrically connected to the drain electrode 14b.

In the above-mentioned structure, a dielectric layer consisting of the anodic oxidation film 9 and the gate insulating layer 10 is formed between the picture element electrode 4 and the additional capacitor electrode 6, so that the picture element electrode 4 and the capacitor electrode 6 constitute an additional capacitor which is connected in parallel to the capacitor caused by the liquid crystal. This additional capacitor store charges when the TFT 5 is On to drive the picture element electrode 4, and substantially retains the voltage applied to the electrode 4 until the next frame scanning period.

In a prior art active matrix type liquid crystal display device having such a configuration, the picture element electrode 4 is electrically insulated from the capacitor electrode 6 by the dielectric layer consisting of the anodic oxidation film 9 and the gate insulating layer 10. However, pinholes often form in the dielectric layer due to the presence of a foreign body in the dielectric layer. In such a case, the picture element electrode 4 disposed on the dielectric layer falls into electrical continuity with the capacitor electrode 6 formed under the dielectric layer. As a result, when the TFT 5 connected to the picture element electrode 4 is ON, current leaks from the picture element electrode 4 to the capacitor electrode 6 to cause a display defect. In a prior art active matrix type liquid crystal display device, therefore, the existence of a pinhole in the two-layered structure between the picture element electrode 4 and the additional capacitor electrode 6 causes an inferior production yield.

SUMMARY OF THE INVENTION

The active matrix type liquid crystal display of this invention, which overcomes the above-discussed and numerous other disadvantages and deficiencies of the prior art, comprises a substrate on which a matrix of picture element electrodes reside, switching elements TFT which are disposed in the vicinity of each of said picture element electrodes, capacitor electrodes each of which is opposed to at least one portion of each of said picture element electrodes, and a dielectric lamination structure consisting of three insulating layers is formed between said picture element electrode and said capacitor electrode.

In a preferred embodiment, the switching element is a thin film transistor, the gate electrode of said thin film transistor and said capacitor electrode are disposed on an insulating substrate, and a gate insulating layer is formed on both said gate electrode and said capacitor electrode, said gate insulating layer being one of said three laminated insulating layers.

In a preferred embodiment, the protective insulating layer is formed on both said thin film transistor and said gate insulating layer, said protective insulating being another one of said three laminated insulating layers.

In a preferred embodiment, the anodic oxidation film is formed on said capacitor electrode, said anodic oxidation film being the further one of said three laminated insulating layers.

In a preferred embodiment, the picture element electrode is disposed on said protective insulating layer.

In a preferred embodiment, the picture element electrode is electrically connected to the drain electrode of said TFT, through a contact hole which is formed in said protective insulating layer.

OBJECTS OF THE INVENTION

Thus, it is an object of the present invention to provide an active matrix type liquid crystal display device in which there is no leakage between a picture element electrode and a capacitor electrode;

It is another object of the present invention to provide an active matrix type liquid crystal display device which can effectively prevent the occurrence of a display defect; and It is a further object of the present invention to provide an active matrix type liquid crystal display device which can be manufactured in high yield.

BRIEF DESCRIPTION OF THE DRAWINGS

This invention may be better understood and its numerous objects and advantages will become apparent to those skilled in the art by reference to the accompanying drawings as follows:

FIG. 1 is a partial sectional view of a substrate used in an embodiment of the invention.

FIG. 2 is a plan view showing one portion of the substrate used in the embodiment.

DESCRIPTION OF THE PREFERRED EMBODIMENTS

Figure 3:
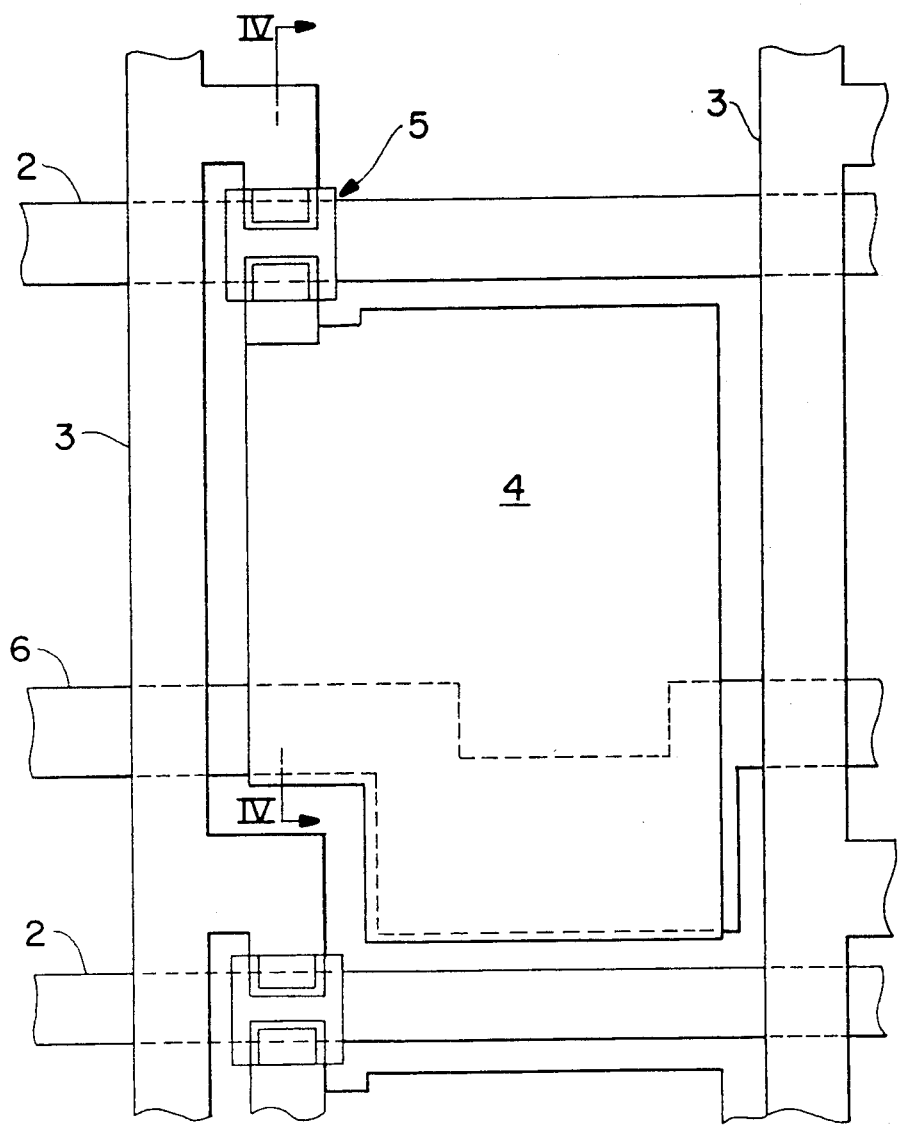
FIG. 3 is a plan view showing one portion of a substrate assembly used in a prior art display device.
Figure 4:
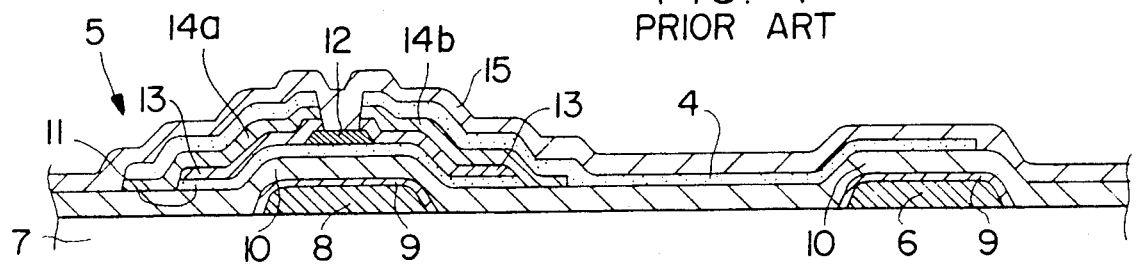
FIG. 4 is a sectional view taken along line IV—IV of the substrate assembly FIG. 3.

A preferred embodiment of the invention is shown in FIGS. 1 and 2. FIG. 2 is a partial plan view of a substrate used in the embodiment, and FIG. 1 is a sectional view taken along line I—I of FIG. 2. On an insulating substrate 27, a plurality of gate bus lines 22 are formed in parallel and horizontally in FIG. 2, and a plurality of source bus lines 23 are formed vertically in the figure. In the vicinity of each intersection of the gate bus lines 22 and source bus lines 23, a TFT 25 is formed. Each TFT 25 drives a picture element electrode 24 which is disposed in each region surrounded by two adjacent gate bus lines 22 and source bus lines 23. Under the picture element electrode 24, a capacitor electrode 26 is formed. On the surface of the insulating substrate 27, a gate electrode 28 of the TFT 25 and a capacitor electrode 26 are formed. The gate electrode 28 is one part of the gate bus line 22. The gate electrode 28 and capacitor electrode 26 can be formed simultaneously, and made of the same material. The above-mentioned structure of the preferred embodiment may be the same as that of the device of FIG. 3.

An anodic oxidation film 29 is formed on each of the gate electrode 28 and capacitor electrode 26. A gate insulating layer 30 is formed on the anodic oxidation films 29 and the remaining surface of the insulating substrate 27.

In the region above the gate electrode 28, an i-a-Si film 31 and n+-a-Si films 33 are laminated on the gate insulating layer 30. The n+-a-Si films 33 are electrically separated by an $SiN_x$ insulating film 32 formed on the i-a-Si film 31. A source electrode 34a and a drain electrode 34b are formed on the n+-a-Si films 33, respectively. The source electrode 34a and drain electrode 34a are made of the same material as that of the source bus lines 23, and formed simultaneously with the source bus lines 23. The structure including the films 31, 32, and 33 and electrodes 28, 34a and 34b constitute the TFT 25. One end portion of the drain electrode 34a extends over the gate insulating layer 30. A protective insulating layer 35 is formed to cover the TFT 25 and the gate insulating layer 30. The picture element electrode 24 is formed on the protective insulating layer 35, and electrically connected to the drain electrode 34b through a contact hole 40 which is formed in the protective insulating layer 35.

In the substrate of the embodiment having the above-described structure, a three-layered dielectric lamination structure consisting of the anodic oxidation film 29, the gate insulating layer 30 and the protective insulating layer 35 is formed between the picture element electrode 24 and the capacitor electrode 26, so that an additional capacitor is formed by these two electrodes 24 and 26 and the three-layered dielectric lamination structure.

Since the additional capacitor comprises the three-layered dielectric lamination structure, the insulation between the picture element electrode 24 and the capacitor electrode 26 will not easily fail as compared with that of the prior art which has a two-layered dielectric structure as mentioned above. Therefore, the possibility of producing electrical continuity between the picture element electrode 24 and the capacitor electrode 26 which is caused by a pinhole can be greatly reduced.

A production process of the preferred embodiment will also be described. On the insulating substrate 27 such as a glass plate, a thin layer of a metal such as Ta, Al, or Ti is deposited in the thickness of 2000–4000 Å by the sputtering or electron beam deposition technique. This thin metal film is patterned to simultaneously form the gate electrode 28 and the capacitor electrode 26. Then, the surface of the gate electrode 28 and the capacitor electrode 26 are subjected to anodic oxidation to make the anodic oxidation film 29 thereon. The thickness of the anodic oxidation film 29 ranges from 1000 Å to 3000 Å. Thereafter, $SiN_x$ is deposited by a plasma CVD technique to form the gate insulating layer 30 (thickness: 2000–5000 Å). As a result, a two-layered dielectric lamination consisting of the anodic oxidation film 29 and the gate insulating layer 30 is formed.

Furthermore, a semiconductor film of a-Si and an insulating film of $SiN_x$ are successively deposited, and then patterned by the photolithography technique to form the a-Si film 31 and the $SiN_x$ insulating film 32. Then, a semiconductor film of n+-a-Si is deposited, and then patterned by the photolithography technique to form the n+-a-Si films 33. A metal such as Ti, Mo or W is deposited by the sputtering or electron beam deposition technique, and patterned by the photolithography technique to form the source electrode 34a and the drain electrode 34b. The protective insulating layer 35 made of $SiN_x$ is deposited in the thickness of 2000–6000 Å by the plasma CVD technique, and the contact hole 40 is opened in the layer 35 by the photolithography technique. Thereafter, a transparent conductive film which is mainly composed of indium oxide is deposited by the sputtering or electron beam deposition technique, and patterned to form the picture element electrode 24 which is electrically connected to the drain electrode 34b through the contact hole 40.

In the substrate thus produced, the three-layered dielectric lamination structure which consists of the anodic oxidation film 29, the gate insulating layer 30 and the protective insulating layer 35 is disposed between the capacitor electrode 26 and the picture element electrode 24, thereby forming an additional capacitor.

The protective insulating layer 35 may be made of another insulating material such as $SiO_2$ in place of $SiN_x$.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix type liquid crystal display device comprising:

a substrate;

a plurality of picture element electrodes arranged in a matrix on said substrate;

a plurality of switching elements, each of said picture element electrodes being associated with a picture element electrode;

capacitor electrodes, each of said picture element electrodes being partially opposed to at least one capacitor electrode to form a capacitor; and a dielectric lamination structure consisting essentially of three insulating layers between said picture element electrode and said capacitor electrode, a first insulating layer extending over the associated switching element to provide protection thereto.

2. The device of claim 1 wherein said substrate is insulating and said switching element is a thin film transistor, a gate electrode of said thin film transistor and said capacitor electrode being disposed on the insulating substrate, and a gate insulating layer being formed on both said gate electrode and said capacitor electrode, said gate insulating layer being one of said three laminated insulating layers.

3. The device of claim 2 wherein a protective insulating layer is the first insulating layer and is formed on both said thin film transistor and said gate insulating layer, said protective insulating layer being another one of said three laminated insulating layers.

4. The device of claim 3 wherein an anodic oxidation film is formed on said capacitor electrode, said anodic oxidation film being the further one of said three laminated insulating layer.

5. The device of claim 3 wherein said picture element electrode is disposed on said protective insulating layer.

6. The device of claim 5 wherein said picture element electrode is electrically connected to the drain electrode of said TFT, through a contact hole which is formed in said protective insulating layer.

7. The device of claim 2, wherein a protective insulating layer is the first insulating layer formed on both said thin film transistor and said gate insulating layer and said picture element electrode is connected to the drain electrode of said thin film transistor through a hole formed on said protective insulating layer, said protective insulating layer being another one of said three laminated layers.

8. The device of claim 3 wherein said protective insulating layer extends under said picture element electrode.

9. A substrate assembly for use in a flat panel display device in cooperation with a display material and a second assembly having at least one picture element electrode, said substrate assembly comprising:

a substrate;

a picture element electrode provided on said substrate, for cooperation with the picture element electrode of said another assembly;

a thin film transistor formed on said substrate and driving said picture element;

a protective insulating layer overlaying said thin film transistor to provide protection therefor;

a capacitor electrode provided on said substrate and underlying said picture element electrode; and, a dielectric lamination structure having at least two insulative layers disposed between said picture element electrode and said capacitor electrode to provide electrical isolation therebetween;

said protective insulating layer extending over said capacitor electrode and under said picture element electrode to further form one of said insulative layers of said dielectric lamination structure and contribute to the electrical isolation provided thereby.

10. The substrate assembly of claim 9 wherein said thin film transistor includes a gate separated from a source and drain by a gate insulating layer, said gate insulating layer forming one of said at least two insulating layers.

11. The substrate assembly of claim 10 wherein said dielectric lamination layer further includes an anodic oxidation film formed on said capacitor electrode, said oxidation film further being formed on said gate of said thin film transistor.

12. The substrate assembly of claim 9 wherein said flat panel display device is a liquid crystal display device and said display material is a liquid crystal material.

13. A substrate assembly for use in a matrix flat panel display device in cooperation with a display material and a second assembly having at least one picture element electrode, said substrate assembly comprising:

a substrate;

a plurality of picture element areas each including a picture element electrode provided on said substrate, for cooperation with the picture element electrode of said another assembly, each picture element area further including, a thin film transistor formed on said substrate and driving said picture element electrode;

a protective insulating layer overlaying said thin film transistor to provide protection therefor;

a capacitor electrode provided on said substrate and underlying said picture element electrode; and, a dielectric lamination structure having at least two insulative layers disposed between said picture element electrode and said capacitor electrode to provide electrical isolation therebetween;

said protective insulating layer extending over said capacitor electrode and under said picture element electrode to further form one of said insulative layers of said dielectric lamination structure and contribute to the electrical isolation provided thereby.

* * * * *

UNITED STATES PATENT AND TRADEMARK OFFICE
CERTIFICATE OF CORRECTION

PATENT NO. : 5,054,887
DATED : OCTOBER 8, 1991
INVENTOR(S) : H. KATO, et al.

It is certified that error appears in the above-indentified patent and that said Letters Patent is hereby corrected as shown below:

In claim 1, column 5, lines 9-10, delete "picture element electrode;" and insert therefore -- said switching element;--

Signed and Sealed this

Twenty-first Day of October 1997

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO.  : 5,054,887
DATED       : October 8, 1991
INVENTOR(S) : H. KATO et al.

It is certified that error appears in the above-indentified patent and that said Letters Patent is hereby corrected as shown below:

In claim 9, column 6, line 5, delete "said picture element" and insert --said picture element electrode--

Signed and Sealed this

Third Day of February, 1998

Attest:

BRUCE LEHMAN

*Attesting Officer*   *Commissioner of Patents and Trademarks*